(12) United States Patent
Bayley

(10) Patent No.: US 6,765,893 B1
(45) Date of Patent: Jul. 20, 2004

(54) DYNAMIC RECOGNITION OF AN EMPTY GENERAL PAGING MESSAGE

(75) Inventor: Gwain Bayley, Carlsbad, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/540,797

(22) Filed: Mar. 31, 2000

(51) Int. Cl.[7] .............................................. H04B 7/216
(52) U.S. Cl. ...................... 370/335; 370/342; 370/441
(58) Field of Search ................................. 370/311, 335, 370/342, 441, 313; 375/140, 147, 149, 152; 455/33.1, 33.2, 33.3, 33.4, 38.1, 38.3, 63, 311, 343, 403, 458, 504, 572, 574, 575

(56) References Cited

U.S. PATENT DOCUMENTS

| | | | |
|---|---|---|---|
| 5,930,706 A | * | 7/1999 | Raith ....................... 455/422.1 |
| 6,041,217 A | | 3/2000 | Martin et al. |
| 6,240,304 B1 | | 5/2001 | Blankenstein et al. |

FOREIGN PATENT DOCUMENTS

GB 0780989 A2 * 6/1997 ............ H04B/1/16

OTHER PUBLICATIONS

Copy of International Search Report dated May 11, 2001.

* cited by examiner

Primary Examiner—Wellington Chin
Assistant Examiner—Mark A Mais
(74) Attorney, Agent, or Firm—Philip Wadsworth; Charles D. Brown; Howard H. Seo

(57) ABSTRACT

A method of and an apparatus for reducing the average power consumption in a remote unit in a wireless communication system. When a remote unit in a slotted mode communication system receives a general paging massage, it deinterleaves and decodes the raw data samples. Prior to parsing, it compares the decoded data samples with samples stored in a memory. Based on this comparison, the remote unit determines whether or not the message is empty. If the message is empty, the remote unit transitions to an inactive state. By comparing before parsing, the remote unit is able to conserve power by entering the inactive state sooner. If no samples are stored in the memory, instead of comparing, the remote unit parses the message and executes any instructions. If, upon parsing, the remote unit determines the message to be empty, at least a portion of the message is stored in the memory.

29 Claims, 6 Drawing Sheets

DYNAMIC RECOGNITION OF AN EMPTY GENERAL PAGING MESSAGE

RELATED APPLICATIONS

The following U.S. patent application filed concurrently herewith, is related to this application and hereby incorporated by reference in its entirety: EFFICIENT DETECTION OF GENERAL PAGING MESSAGES IN POOR SIGNAL TO NOISE ENVIRONMENTS now issued as U S. Pat. No. 6,539,242.

FIELD OF THE INVENTION

The invention relates to wireless communication systems. In particular, the invention relates to dynamically recognizing an empty general paging message received by a remote unit in a wireless communication system.

BACKGROUND OF THE INVENTION

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, a controller in the remote unit distinguishes pilot signals from multiple base stations based on the time offset.

The controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's affect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method of and an apparatus for demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of the signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips (i.e., one bit in the PN sequence) and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions such as, for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation and may be annoying to the user of the remote unit.

FIG. 3 shows an extended portion of PN space on the horizontal axis. The three groups of peaks 30, 32, 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establish bi-directional communications with a base station. For example, a cellular telephone remains idle for significant periods of time when no call is in process. However, to ensure that any message directed to a remote unit is received, the remote unit continuously monitors the communication channel, even while it is idle. For example, while idle, the remote unit monitors the forward link channel from the base station to detect incoming calls. During such idle periods, the remote unit continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bi-directional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcasts messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as assigned slots. The paging channel continually transmits messages in numbered slots, repeating the slot sequence such as, for example, every 640 slots. When a remote unit enters the coverage area of a base station or if a remote unit is initially powered on, it communicates its presence to a preferred base station. Typically, the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry such as, for example, circuits which monitor pilot signals transmitted by base stations to detect changes in the wireless channel including the search engine. Using its internal timing, the remote unit transits to its active state a short period of time before the next occurrence of an assigned slot.

When transitioning to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reaquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bi-directional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station in the form of, for example, a sleep command.

During its assigned slot, the remote unit's search engine measures the pilot signal strength of the preferred base station as well as the pilot signal strengths of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment. For example, if one of the multipath signal instances weakens to the point that it is unusable, the remote unit may reassign demodulation elements accordingly.

Knowing the nominal PN offset of the preferred base station as well as a neighboring set of base stations, the controller typically passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive, idle state.

During the assigned slot, the base station sends a general paging message as well as other message types. The general paging message carries information such as whether all messages directed to remote units operating in the slotted mode and active in the current slot have been sent by the end of this general paging message, whether all broadcast messages have been sent by the end of the current general paging message, the class of remote units which are being addressed, service option requests directed to a specific remote unit and other messages such as, for example, those described in IS-95.

When no more remote unit-specific or broadcast messages are available for the assigned slot time, the base station sends an empty general paging message. Upon receipt of the empty general paging message, the remote units simply return to inactive state.

FIG. 4 is block diagram showing a portion of a prior art remote unit used to receive the general paging message. A receiver 40 receives wireless link signals including the general paging message. The receiver 40 provides for reception and down-conversion of the wireless link signal and also provides despreading in a CDMA environment as well as other demodulation functions. The receiver 40 provides a series of digital bit values at its output.

According to well-known wireless link protocols such as IS-95, before data is transmitted over the wireless link, it is divided into a series of blocks. The blocks are reordered in time such that the block order is non-time sequential as transmitted over the wireless link period. This method of transmitting the blocks is referred to as interleaving, and the process of reordering the blocks is referred to as deinterleaving. Interleaving helps mitigate the deleterious effects of fading on the wireless channel by reducing the probability that a time-sequential set of blocks will be lost during a fade. Instead, when a series of blocks are lost due to a fade, they are non-time sequential after the deinterleaving process and, thus, are more easily corrected by the decoding process. A deinterleaver 42 performs the deinterleaving function. The deinterleaver 42 receives samples from the receiver 40 and accumulates a series of block data. When an entire set of blocks has been received, the deinterleaver 42 reorders the blocks in time-sequential order and outputs them to a decoder 44.

The decoder 44 can be a convolutional decoder operating at rate one-half (R=½) with a constraint length of nine (K=9). One common form of convolutional decoders is the Virterbi decoder. A Virterbi decoder creates soft decision data based upon groups of data. The entire group of data must be presented to the decoder before the decoder presents a soft decision output. The soft decision data is collected in a buffer within the decoder 44 for processing.

In general, the general paging message is comprised of several groups of decoder data. When the decoder buffer contains sufficient data, the data is passed to a message parser 46. The message parser 46 performs such functions as collection of bits in the message, computing and verifying any cyclic redundancy code (CRC) or other error checking code, translation of the message into an internal format, copying the transformed message into a buffer, and placement of the transformed message onto a queue for the proper protocol task. The message is evaluated field-by-field. In general, the processes of the decoder 44 and the message parser 46 are controlled by a controller 48.

There is a need in the art to minimize the amount of time required by the remote unit to parse a general paging message before determining if the remote unit is to enter the inactive state. The processes carried out by a message parser are extensive and require a significant amount of time. Until the message parser is freed from the general paging message, the remote unit remains active. It is only after receipt of a sleep command from the base station or the receipt of an empty general paging message that the remote unit returns to the inactive state.

In general, the general paging message spans across several sets of deinterleaved blocks of data. Thus, in order to process the entire general paging message, the message parser must wait until all of the blocks which comprise the general paging message have been received. For this reason, previously, little advantage was obtained by increasing the speed at which the decoder operates. Even if the decoder was operated at a high frequency, the message parsing task must wait for multiple deinterleaving processes to be executed. Thus, increasing the rate at which the decoder operates merely increases the amount of time that the data at the output of the decoder is buffered before message processing begins.

SUMMARY OF THE INVENTION

The invention is directed to methods of and an apparatus for recognizing an empty general paging message in a wireless communication system. In an aspect of the present invention, the invention can be used for reducing the average power consumption in a remote unit. In a slotted mode communication system, a remote unit will alternate between active and inactive states. When the remote unit is in its active state it monitors the wireless channel and receives messages from a base station. At the completion of its active state, either when commanded by the base station or reaching the end of its assigned slot, the remote unit enters an inactive state. During the inactive state the remote unit reduces power consumption by removing power from selected circuitry, such as, for example, circuitry used to monitor the wireless channel.

A method of processing base station signals by a remote unit according to one aspect of the present invention includes receiving raw data samples of a message from a base station; decoding the raw data samples to obtain decoded data samples; comparing the decoded data samples with stored reference samples before the decoded data samples are parsed; and determining, based on the comparing, contents of the message.

In another aspect of the invention, the message may be received in an interleaved form and may be deinterleaved after the receiving.

In a further aspect of the invention, the method may further comprise transitioning the remote unit to a sleep mode when the determining determines the message is empty.

In another aspect of the invention, a remote unit includes a receiver configured to receive paging messages as raw data samples; a decoder configured to obtain decoded data samples from the raw data samples; a memory configured to store data samples; and a comparator configured to compare the decoded data samples with the data samples in the memory to determine contents of the paging messages.

In yet another aspect of the invention, the receiver may be configured to receive the paging message in an interleaved form and may be configured to deinterleave said paging message.

In a further aspect of the invention, the remote unit, when no stored reference samples exist in memory, may parse the paging message and may store at least a portion of the paging message if the paging message is empty.

BRIEF DESCRIPTION OF THE DRAWINGS

The features, objects and advantages of the present invention will become more apparent from the detailed description set forth below when taken in conjunction with the drawings in which like references characters identify correspondingly throughout, and wherein.

DETAILED DESCRIPTION OF THE INVENTION

Figure 1:
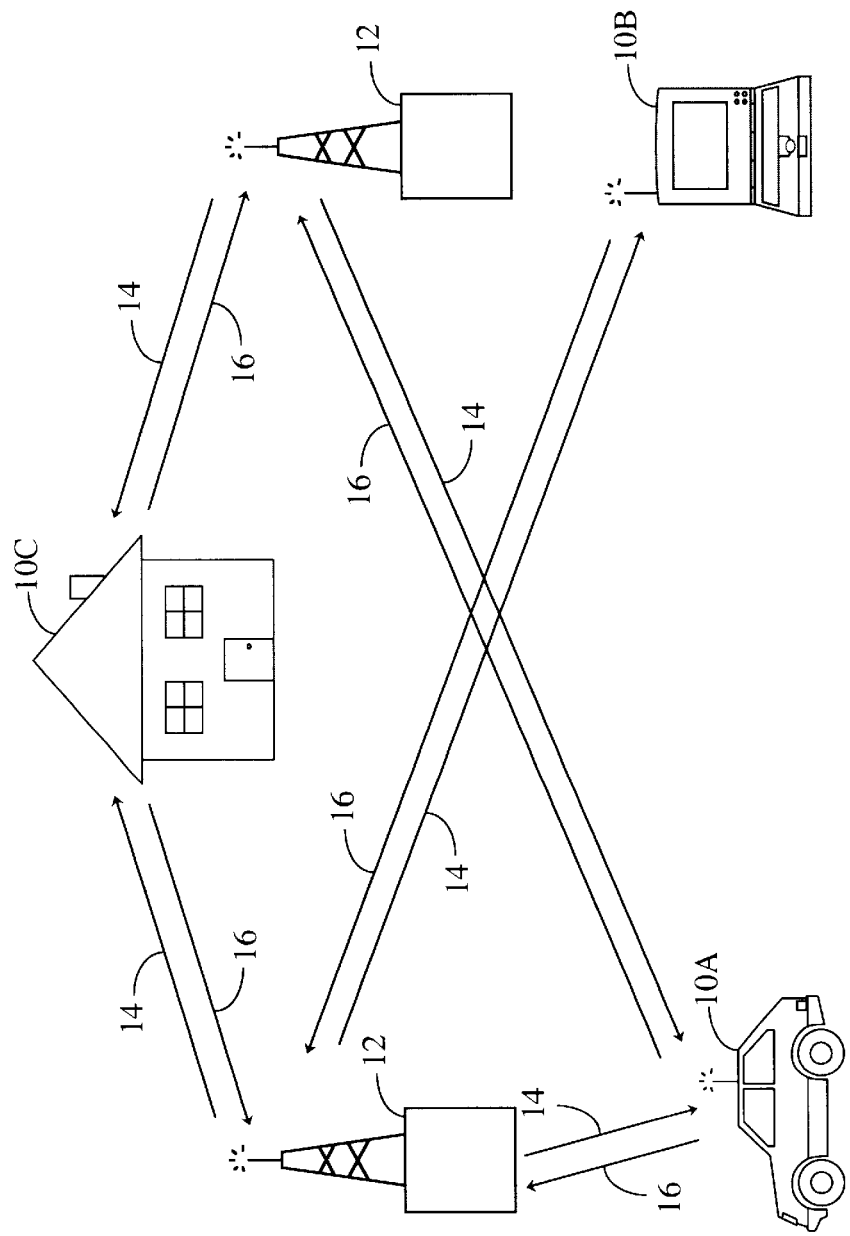
FIG. 1 is a representative diagram showing a typical modern wireless communication system.
Figure 2:
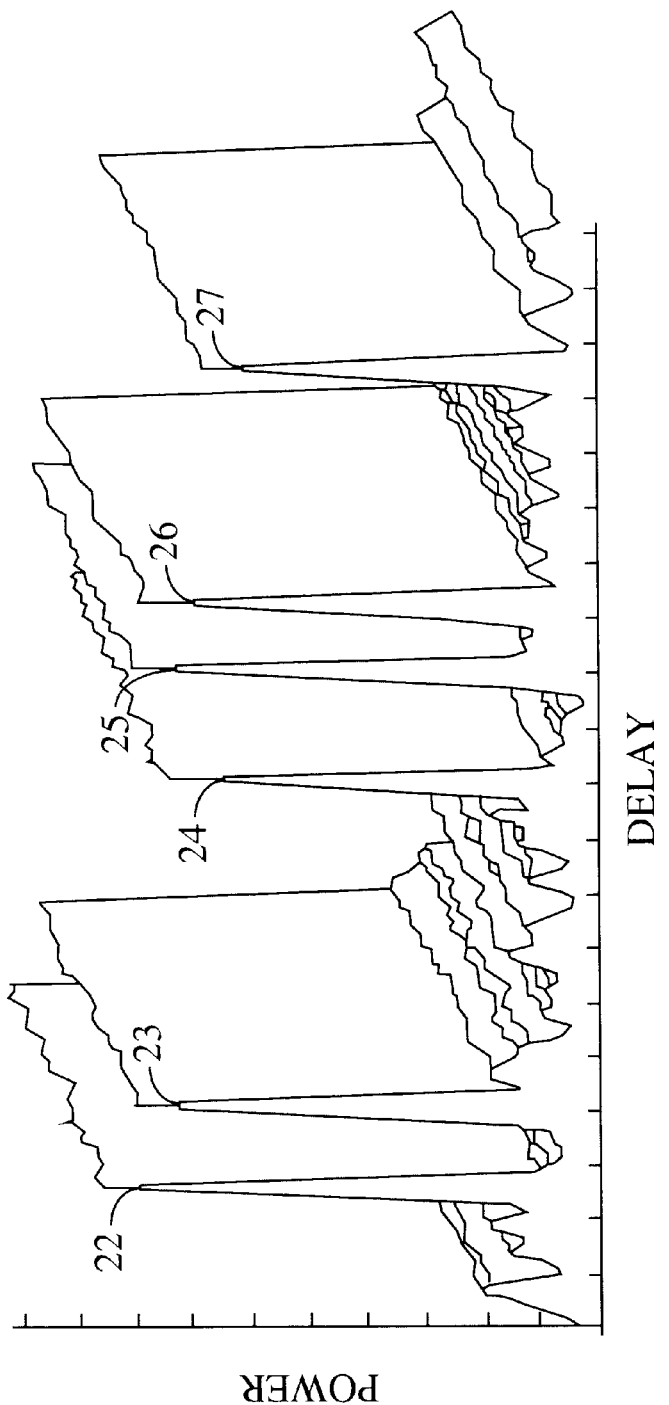
FIG. 2 is a graph showing an exemplifying set of multiple signal instances of a pilot signal from a single base station arriving at a remote unit.
Figure 3:
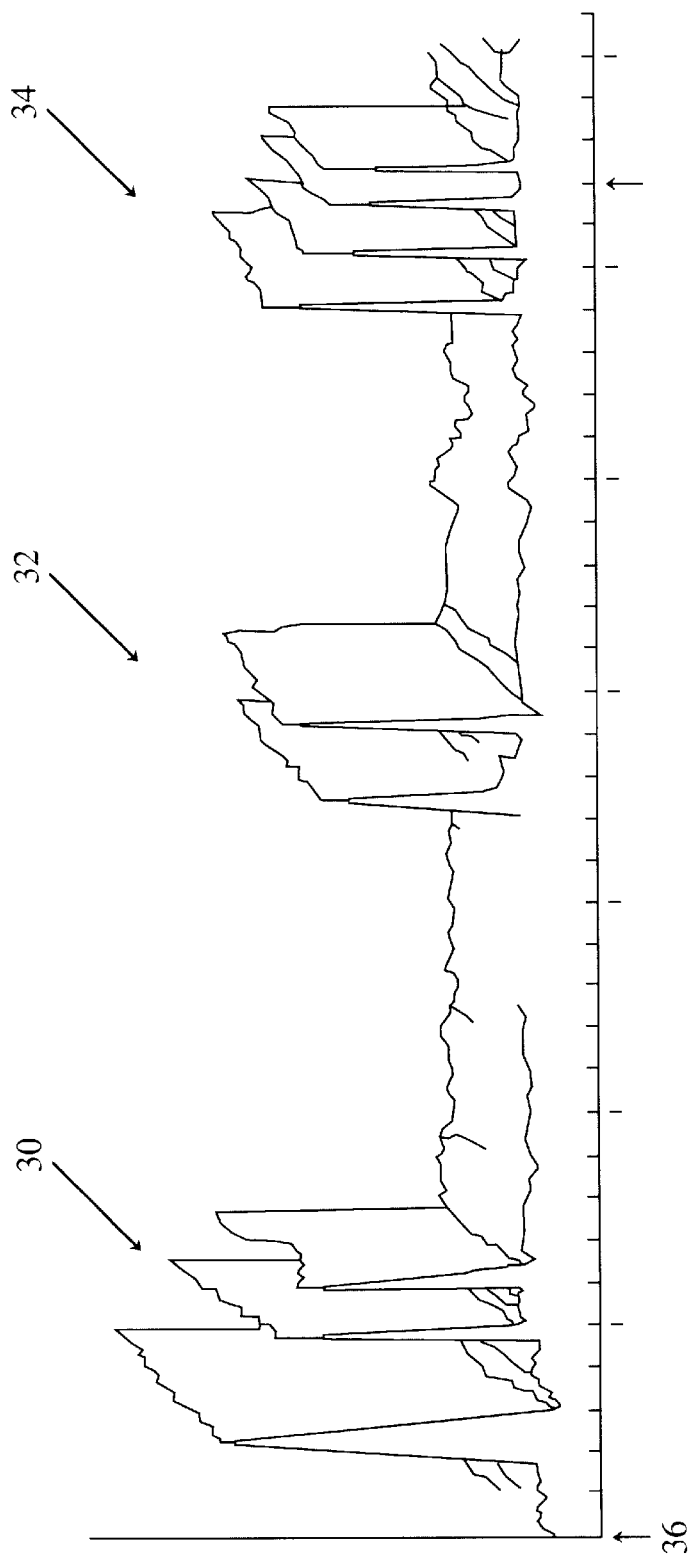
FIG. 3 is a graph showing an exemplifying set of multiple signal instances of pilot signals from multiple base stations arriving at a remote unit.
Figure 4:
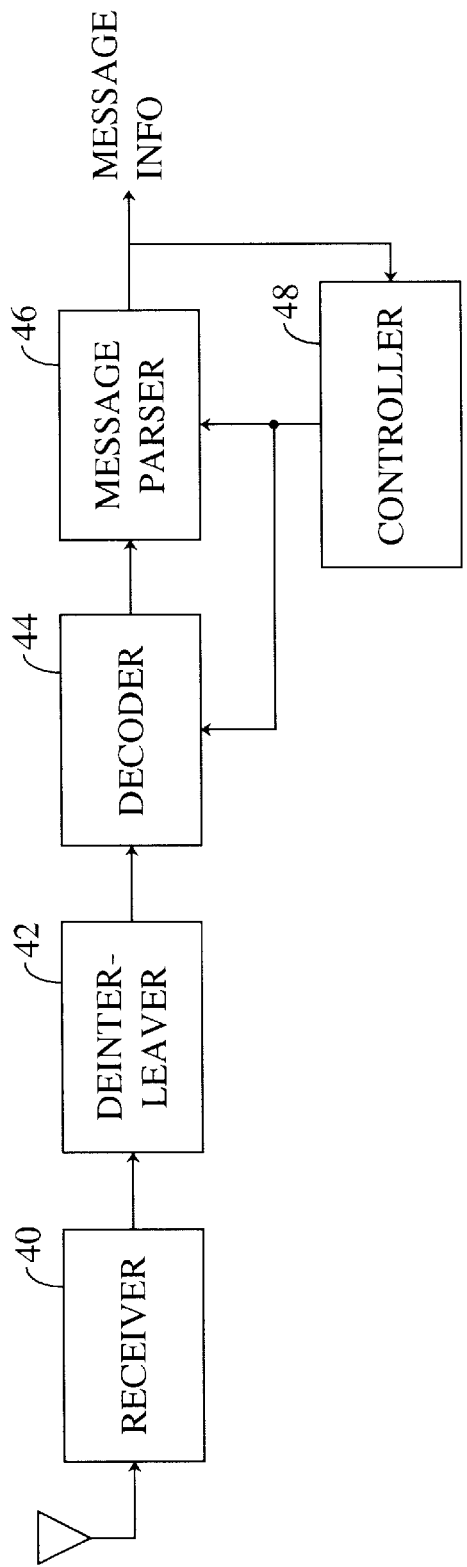
FIG. 4 is a block diagram illustrating a portion of a remote unit used to receive a general paging message.
Figure 5:
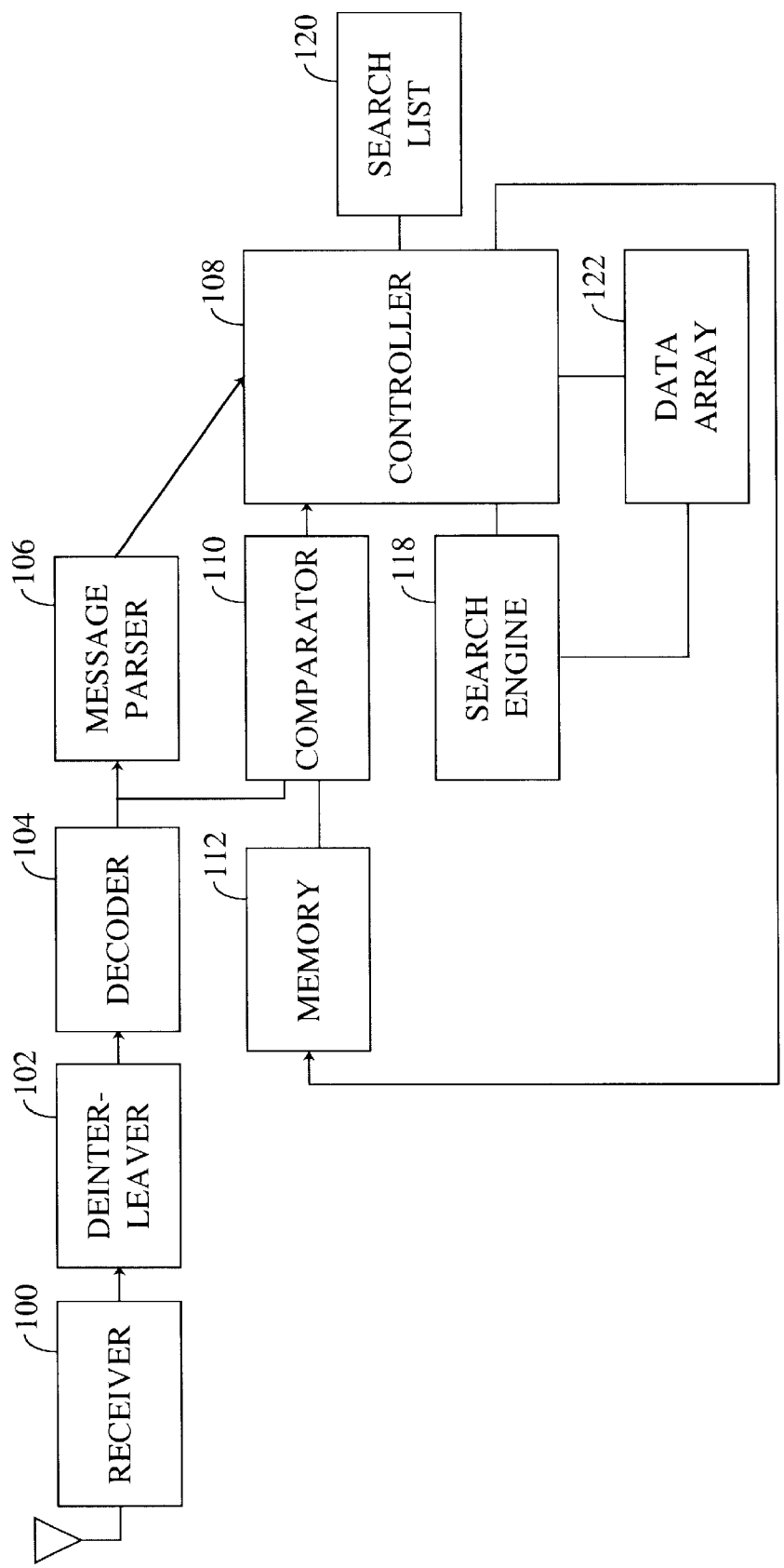
FIG. 5 is a block diagram of an embodiment of the invention, illustrating a portion of a remote unit used to receive a general paging message and detect if the general paging message is empty

FIG. 5 is a block diagram of a remote unit which allows for the early detection of an empty general paging message. A receiver 100 receives wireless link signals including the paging channel messages. The receiver 100 provides for reception and down-conversion of the wireless link signal and also provides despreading in a CDMA environment, as well as other demodulation function. The receiver 100 provides a series of digital values at its output digital.

According to well-known wireless link protocols, such as IS-95, before data is transmitted over the wireless link, it is divided into a series of blocks. The blocks are reordered in time such that the block order is non-time sequential as transmitted over the wireless link. This method of transmitting blocks is referred to as interleaving, and the process of reordering the blocks is referred to as deinterleaving. A deinterleaver 102 performs the deinterleaving function. The deinterleaver 102 receives samples from the receiver 100 and accumulates a series of blocks data. When an entire set of blocks has been received, the deinterleaver 102 reorders the blocks in time-sequential order and outputs them to a decoder 104.

In one embodiment, the decoder 104 is a convolutional decoder. One common form of convolutional decoder is the Virterbi decoder. A Virterbi decoder creates soft decision data based upon groups of data.

When the decoder buffer contains sufficient data, the data is passed to a message parser 106. The message parser 106 performs such functions as collection of bits in the message, computing and verifying any cyclic redundancy code (CRC) or other error checking code, translation of the message into an internal format, copying the transformed message into a buffer, and placement of the transformed message onto a queue for the proper protocol task. The message is evaluated field-by-field. In general the processes of the decoder 104 and the message parser 106 are controlled by a controller 108.

The controller 108 is also in communication with a search list 120 stored in memory, such as for example, a RAM or a portion of an Application Specific Integrated Circuit (ASIC) or other suitable electronic storage. In addition, the controller 108 is in communication with a search engine 118 so as to pass search parameters to the search engine 118. The search engine 118 is in communication with a data array 122 so as to store search results in the data array 122. The controller 108 is also in communication with the data array 122, thereby providing the controller 108 access to the search results stored therein. In one embodiment, the controller 108 is a microprocessor. The controller 108 may be an ASIC, a Field Programmable Gate Array (FPGA), discrete logic, analog circuitry, or other control circuitry. Both the controller 108 and the search engine 118 can be fabricated on the same ASIC. Additionally, the search list 120 and the data array 122 can be included on the same or a different ASIC. The configuration of the hardware in the remote unit may be controlled through firmware, allowing field upgrade of a remote unit by downloading new firmware.

In general, operation of the remote unit is controlled by configuration of the hardware and software executed on the controller 108. The hardware configuration may be established by firmware, software, hardwiring of discrete devices or any combination of the above.

The output of the decoder 104 is provided to a comparator 110. The comparator 110 performs a pattern-correlation process. The comparator 110 compares the output of the decoder 104 with a reference pattern stored within a memory 112. The pattern-correlation process performed by the comparator 110 need not wait for the reception and deinterleaving of the entire process before the pattern-correlation process is begun or even before a correlation is determined. For example, the controller 108 may, based on the output of the comparator 110, determine that the received samples are sufficiently similar to the stored reference pattern that a determination of the contents of the message can be made. If the determination of the contents reveals that the message is an empty general paging message, the remote unit can go into an inactive state. Significant gains can be achieved by running the decoder 104 at a higher rate. As soon as the first set of data is available from the deinterleaver 102, the decoder 104 can decode the data and the pattern-correlation process can begin.

The comparator 110 may be implemented via hardware in the form of, for example, an application specific integrated circuit (ASIC) or a portion of an ASIC, a field programmable gate array (FPGA) or an array of discrete logic elements. The hardware is configured such that a series of data bits from the decoder 104 can be compared (for example, exclusive ORed or ANDed) with a series of data bits stored in the memory 112. Alternatively, the comparator 110 may be implemented through the execution of software or firmware by the controller, for example. A reference pattern corresponding to an empty general paging message (or, as discussed below, a portion or template of such a message) stored in memory 112 is compared directly to the contents of the decoder output buffer by the comparator 110.

As discussed in greater detail with reference to FIG. 6 below, the memory 112 contains the decoder output values corresponding to a reference pattern. The reference pattern may be an empty paging message previously received by the remote unit or a portion or template of such message, or a pattern sent by the base station for use in recognizing a command for the remote unit to enter its inactive state. If the decoder output corresponds with the reference pattern stored in the memory 112, the comparator 110 alerts the controller 108. Upon receiving such an alert, the controller 108 can immediately enter the inactive state, because the message being received corresponds with the reference pattern stored in the memory 112. Thus, the received general paging message is either an empty general paging message containing no information for the remote unit, or a message commanding the remote unit to enter its inactive state. Following a match, the remote unit may enter its inactive state without missing any messages intended for it.

Figure 6:
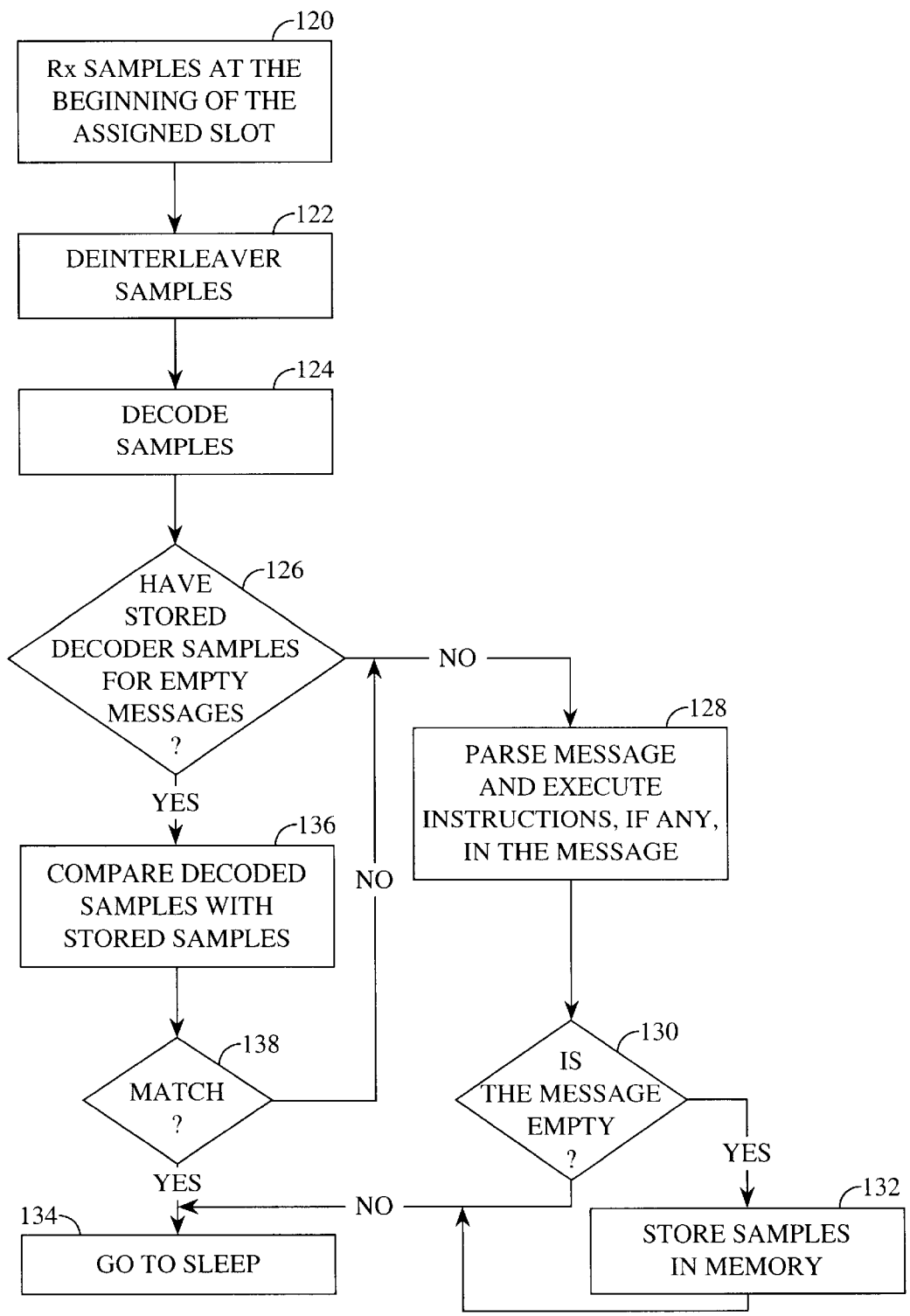
FIG. 6 is a flow chart of an embodiment of the invention illustrating detection of an empty general paging message.

FIG. 6 is a flowchart illustrating the process or method for detection of an empty general paging message which can be carried out by the remote unit depicted in FIG. 5. The process can be implemented under the control of software, firmware or hardware, or combinations of the same, as discussed above.

In block 120, the remote unit receives samples at the beginning of the assigned time slot, for example, using the receiver 100. In block 122, the received sample is deinterleaved. In block 124, the deinterleaved samples are decoded using, for example, the decoder 104. In block 126, the controller 108, for example, determines whether a reference pattern corresponding to an empty general paging message previously received for the current preferred base station is stored in, for example, the memory 112.

If no such reference pattern is stored, in block 128, the message is parsed when available and any instructions found in the message are executed. In block 130, it is determined whether the message was an empty general paging message. If so, in block 132, the received decoded samples are stored in, for example, the memory 112. Alternatively, either all of the decoded samples or only a portion of the general paging message may be stored. For example, a pre-selected number of bits or selected fields of the empty general paging message may be stored for subsequent comparison, the number of bits being selected to provide sufficient confidence that the message is indeed empty. Then, in block 134, the remote unit goes to sleep to await the beginning of the next assigned slot.

In one embodiment, the reference pattern is stored as a template in memory when the remote unit is manufactured. Thus, the memory 112, for example, always contains a reference pattern. Alternatively, as described above, the reference pattern may be stored by parsing a message and storing at least a portion of it if it is an empty general paging message.

Referring again to block 126, if a reference pattern corresponding to either an empty general paging message or a message commanding the remote unit to sleep mode is stored in, for example, the memory 112, flow continues to block 136 where the received samples are compared with the stored reference pattern. The comparator 110, for example, performs a pattern-correlation process by comparing the decoded samples with the stored reference pattern.

In a communication system operating according to IS-95, the comparator 110, for example, monitors the output bits of the decoder 104. IS-95 defines certain standard information in all general paging messages. For example, a general paging message includes the following fields: Synchronized Capsule Indicator (SCI), MSG LENGTH, MSG TYPE, CONFIG MSG SEQ, CLASS O DONE and CLASS 1 DONE. The bit pattern corresponding to this standard information can be used as the reference pattern. As described above, the comparator 110, for example, compares the output bits of the decoder 104 with the stored reference pattern. When the output of the decoder matches or, alternatively, is sufficiently similar to the stored reference pattern in which these fields correspond to an empty general paging message, for example, the controller 108 determines that the received message is an empty general paging message.

In block 138, the controller 108, for example, based on the output of the comparator, determines whether the decoded samples correspond to an empty general paging message. If so, flow continues to block 134 where the remote unit goes to sleep. In this way, the extensive and time-consuming process of parsing the message is bypassed.

Referring again to block 138, if the decoder samples do not match the reference pattern stored in memory, flow continues to block 128. Once again, in block 128, the message is parsed and instructions, if any, in the message are executed. Flow continues to blocks 130, 132 and 134 as described above. In this way, if the stored reference pattern corresponding to the empty paging message changes, the reference pattern is updated accordingly.

In one embodiment, blocks 124, 126, 128 and 136 are executed at least partially simultaneously. For example, as the decoder 104 produces decoded symbols, the controller can determine whether the proper decoder samples have been stored in memory 112. As soon as the data is available from the decoder 104, comparator 110 can begin to compare the received samples with the stored reference pattern.

In another embodiment, the comparison process is executed on only a subset of the decoded samples. For example, the comparator 110 can compare the stored reference pattern to the decoded samples until a predetermined number of matches are detected. The predetermined number can be chosen to be a fairly small number if the consequences of missing a non-empty general paging message are not catastrophic. The predetermined number can be chosen as a relatively large number if the consequences for missing a non-empty general paging message are more severe. In general, a plurality of existing or later-developed pattern-correlation techniques can be used in order to determine a match between the received samples and the reference pattern stored in memory. Thus, the number of bits of the empty message, for example, stored in memory may be selected to achieve the particular goals of the system.

In a system in which the remote unit is mobile, typically the remote unit performs a series of handoffs selecting a series of preferred base stations as the remote unit moves between the coverage areas of the various base stations. In one embodiment, the memory 112 stores the raw decoder data representing an empty paging message for multiple base stations. As the remote unit moves between the coverage area of various base stations, the controller can select the appropriate data.

In many embodiments, the remote unit is only capable of going to sleep at certain discrete time intervals. For example, in the CDMA system, the remote unit may only be capable of going to sleep on a predetermined spreading code boundary. For example, in a CDMA IS 95 system, each base station transmits a cyclical pilot signal, each cycle of the pilot signal corresponding to a roll of the pseudonoise (PN) code sequence. The remote unit may be capable of going to sleep only at the completion of the generation or reception of each roll of the PN code. In such a case, decreasing the detection time by several milliseconds may allow the remote unit to go to sleep many milliseconds earlier than it would otherwise if the detection of an empty general paging message can be made shortly before the predetermined boundary rather than shortly after. If made shortly after the predetermined boundary, the remote unit cannot go to sleep until the next such boundary.

The teachings of the present invention may be applied to many different operating environments. In general, the process of detecting a message based on raw decoder output rather than from extensive message parsing can be advantageous in any system in which rapid detection of the message is important. For example, the invention can be used in a system in which rapid detection of an emergency signal is necessary even if the remote unit is not operating in slotted mode. The invention can also be applied to wireline, rather than wireless, systems. The message may also be advantageously applied in systems in which long message lengths and a large degree of interleaving are used.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) application Ser. No. 08/987,172, entitled MULTI CHANNEL DEMODULATOR, filed on Dec. 9, 1997; and (8) application Ser. No. 09/283,010, entitled PROGRAMMABLE MATCHED FILTER SEARCHER, filed on Mar. 31, 1999;

each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for use by a remote unit in a wireless communication system of processing base station signals, comprising:

receiving raw data samples of a message from a base station;

decoding said raw data samples to obtain decoded data samples;

comparing said decoded data samples with a reference pattern before said decoded data samples are parsed;

determining the contents of said message based on said comparing; and when the reference pattern is not stored parsing said message and storing at least a portion of said message as the reference pattern in a memory.

2. The method according to claim 1, wherein said storing stores a predetermined section of said message.

3. The method according to claim 1, further comprising: changing a mode of operation of said remote unit if said message is empty.

4. The method according to claim 1, further comprising: transitioning said remote unit to a sleep mode when said message is empty.

5. A remote unit for use in a communication system, comprising:

a receiver configured to receive a paging message as a raw data sample;

a decoder configured to obtain decoded data samples from said raw data sample;

a memory configured to store a reference pattern;

a comparator configured to compare said decoded data samples with said reference pattern; and a controller configured to control operation of said remote unit, wherein said controller is configured to parse said paging message and to store at least a portion of said paging message if said paging message is empty and when no stored samples exist in memory.

6. The remote unit according to claim 5 further comprising a deinterleaver configured to deinterleave said paging message when said paging message is received in interleaved form.

7. The remote unit according to claim 5, wherein said controller is further configured to store a predetermined section of said paging message.

8. The remote unit according to claim 5, wherein said remote unit is configured to change a mode of operation when said controller recognizes contents of said paging message as empty.

9. The remote unit according to claim 5, wherein said remote unit is configured to transition to a sleep mode when said controller recognizes contents of said paging message as empty.

10. The remote unit according to claim 5, wherein said comparator comprises a microprocessor.

11. A remote unit for use in a wireless communication system with multiple base stations, said base stations configured to continually broadcast paging messages in an interleaved form, comprising:

a receiver configured to receive paging messages as raw data samples;

a decoder coupled to said receiver and configured to obtain decoded data samples from said raw data samples;

a memory configured to store a reference pattern;

a controller configured to control operation of said remote unit; and a comparator configured to compare said decoded data samples with said reference pattern, wherein said controller is further configured to, when no reference samples exist in memory, parse said paging message and to store at least a portion of said paging message if said paging message is empty.

12. The remote unit according to claim 11, further comprising a deinterleaver for deinterleaving said paging messages received in interleaved form.

13. The remote unit according to claim 11, wherein said controller is further configured to store a predetermined section of said paging message.

14. The remote unit according to claim 11, wherein said remote unit is configured to change a mode of operation when said controller recognizes contents of said paging message as empty.

15. The remote unit according to claim 11, wherein said remote unit is configured to transition to a sleep mode when said controller recognizes contents of said paging message as empty.

16. The remote unit according to claim 11, wherein said comparator comprises an exclusive OR array.

17. The remote unit according to claim 11, wherein said comparator comprises a microprocessor.

18. A remote unit for use in a communication system, comprising:

means for receiving a paging message as a raw data sample, means for decoding said raw data sample to obtain decoded data samples;

means for storing a reference pattern;

means for comparing said decoded data samples with said reference pattern; and means for controlling operation of said remote unit wherein said means for controlling is configured to parse said paging message and to store at least a portion of said Paging message if said paging message is empty and when no stored samples exist in said means for storing.

19. The remote unit according to claim 18 further comprising means for deinterleaving said paging message when said paging message is received in interleaved form.

20. The remote unit according to claim 18, wherein said means for controlling is further configured to store a predetermined section of said paging message.

21. The remote unit according to claim 18, wherein said remote unit is configured to change a mode of operation when said means for controlling recognizes contents of said paging message as empty.

22. The remote unit according to claim 18, wherein said remote unit is configured to transition to a sleep mode when said means for controlling recognizes contents of said paging message as empty.

23. The remote unit according to claim 18, wherein said means for comparing comprises a microprocessor.

24. A method for use by a remote unit in a wireless communication system of recognizing an empty general paging message, comprising:

receiving a message from a base station;

comparing said message with a reference pattern before said message is parsed;

determining whether said message is an empty general paging message based on said comparing; and when no reference pattern is stored, parsing said message and storing at least a portion of said message as a stored reference pattern in a memory.

25. The method according to claim 24, wherein said reference pattern is stored in a memory located in said remote unit.

26. The method according to claim 24, wherein said reference pattern corresponds to an empty general paging message.

27. The method according to claim 24, wherein said storing stores a predetermined section of said message.

28. The method according to claim 24, further comprising:

changing a mode of operation of said remote unit if said message is an empty general paging message.

29. The method according to claim 24, further comprising:

transitioning said remote unit to a sleep mode when said message is an empty general paging message.

* * * * *